March 16, 1943.   B. E. WILLIAMS   2,314,301
METHOD OF AGING MEAT
Filed Feb. 24, 1941   2 Sheets-Sheet 1

ATTEST

Beverly E. Williams
INVENTOR

BY
ATTORNEY

March 16, 1943.   B. E. WILLIAMS   2,314,301
METHOD OF AGING MEAT
Filed Feb. 24, 1941   2 Sheets-Sheet 2

ATTEST-

Beverly E. Williams
INVENTOR

BY

ATTORNEY

Patented Mar. 16, 1943

2,314,301

UNITED STATES PATENT OFFICE 2,314,301

METHOD OF AGING MEAT

Beverly E. Williams, Chicago, Ill., assignor to Industrial Patents Corporation, Chicago, Ill., a corporation of Delaware Application February 24, 1941, Serial No. 380,172

6 Claims. (Cl. 99—107)

This invention relates to the treatment of fresh meat and has to do particularly with the aging of carcasses of beef, lamb and veal, and wholesale or retail cuts thereof.

An object of the invention is to provide a method for aging meat to improve the tenderness and flavor.

Another object of the invention is to age meat under tenderizing conditions without substantial shrinkage.

A further object of the invention is to provide an improved means for aging and marketing meat without handling or transferring from one container to another.

Other objects of the invention will be apparent from the description and claims which follow.

In the preparation of meat such as beef for market, the carcass beef and particularly the best cuts are often aged to increase the tenderness and improve the flavor. It is customary to place the meat in a refrigeration chamber wherein temperatures of about 35 degrees F. are usually maintained, although temperatures varying from slightly below freezing to slightly above freezing may be used. The temperature must be carefully controlled because too low a temperature retards the enzymatic action and too high a temperature tends to cause putrifaction. The meat is held under refrigeration for two to four weeks.

It has been found that a high relative humidity promotes the action of enzymes causing tenderization, but too high humidity encourages the growth of mold and slime on the surface of the meat. When the atmosphere is relatively dry, there occurs dehydration which retards the enzymatic action and produces darkening of the surface and excessive shrinkage. In the ordinary cooler, the humidity ranges around 80 to 85 per cent and the circulation of air therein under such conditions causes an appreciable dehydration of the meat over the aging period whereby shrinkage and uneven aging occurs. On the other hand, if the meat is kept in a confined space without air circulation, the humidity builds up until the air becomes saturated and thereafter overaging or deterioration may occur and a moldy or soft slimy product result.

The present invention contemplates the aging of meat in a substantially confined space wherein the circulation of air is sufficiently restricted to produce a relatively high humidity and favorable aging conditions, but circulation or diffusion of air from the outside into said confined space is permitted in sufficient amount to avoid the unfavorable effects of a completely confined zone.

In accordance with the invention, the meat is enclosed in an aging zone substantially impervious to the outside atmosphere, but sufficient circulation or diffusion of air from the atmosphere is permitted to create optimum conditions for aging. In this way the humidity is maintained sufficiently high to prevent dehydration and to promote the desirable aging but insufficient to cause deterioration and formation of mold or slime.

The zone in which the meat is confined may be any chamber or container providing adequate space for the meat and equipped with apertures, openings or perforations in sufficient number and size to permit the required diffusion or circulation of air or other gas into and out of the zone. The amount of diffusion may be controlled by regulating the area of such openings which may be fixed or adjustable as by doors, gates or valves. In addition, the circulation may be modified or assisted by fans or by using variable pressures inside and outside the aging zone.

The zone containing the meat is preferably located within a larger chamber or container which is maintained under substantially uniform conditions of temperatures and humidity, but usually of considerable lower humidity than that within the meat container. For example, the containers may be disposed within an ordinary cooler or refrigerator. It has been found advantageous to place a plurality of such containers on shelves within a relatively large cooler. As an alternative, cases containing a plurality of compartments equipped with doors may be arranged in a refrigerator and the pieces of meat to be aged placed as desired in individual compartments of said cases.

The invention will be more fully understood by reference to the accompanying drawings wherein.

Figure 3:
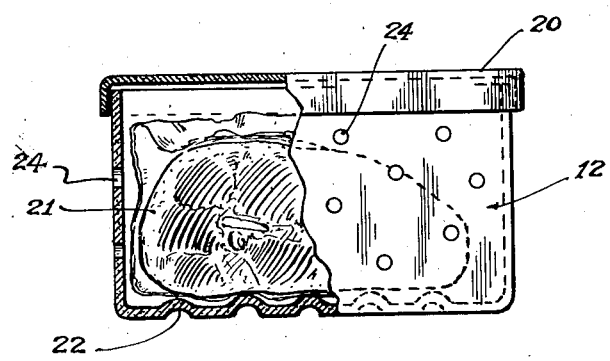
Figure 3 is a view partly in section of an individual aging box suitable for placing on one of the open shelves A of Figures 1 and 2.

Referring to the drawings, the numeral 10 designates an insulated refrigerator or refrigerated chamber which may be of any preferred type and size. A conventional packing house cooler may be used. The chamber is refrigerated by any convenient means, for example, by brine coils 11. The refrigerator as shown contains open shelves A and a case B equipped with compartments 16. If desired the refrigerator may contain only open shelves or only compartment cases, depending upon the use to be made thereof. It may be desirable to locate the brine coils overhead near the ceiling and to build or locate shelves or cases on or around the walls of the chamber. In case the meat cuts are to be aged in individual boxes 12 as shown in Figure 3, it may be necessary to provide the refrigerator with only open shelves so that the boxes containing the meat may be placed into the spaces 15 of the shelves. On the other hand, if it is undesirable or unnecessary to age the pieces of meat in the individual boxes, the refrigerator may be equipped all or in part with the compartment cases and the pieces of meat are placed in the individual compartments 16 as shown in Figure 4.

The aging box 12 is intended for individual cuts of meat and may be of any convenient shape or size adapted to receive retail or wholesale cuts of meat. In some cases, particularly in the case of retail cuts which may or may not be sliced, one or more cuts may be placed in a single box. The box is equipped with tightly fitting top 20 which may be removed for inserting a piece of meat 21. The bottom may be provided with corrugations 22 to permit circulation of air when the box is set upon a flat solid base. The sides of the box, as well as the top if desired and also the doors of compartments 16, are provided with small holes or perforations 24 which may be arranged at random or in any preferred design. The box may be constructed of a suitable material, such as fibre, metal or wood. The boxes are preferably employed when it is desired to package cuts of meat before aging so that it is unnecessary to change containers before shipping or delivery to the buyer or consumer.

Figure 1:
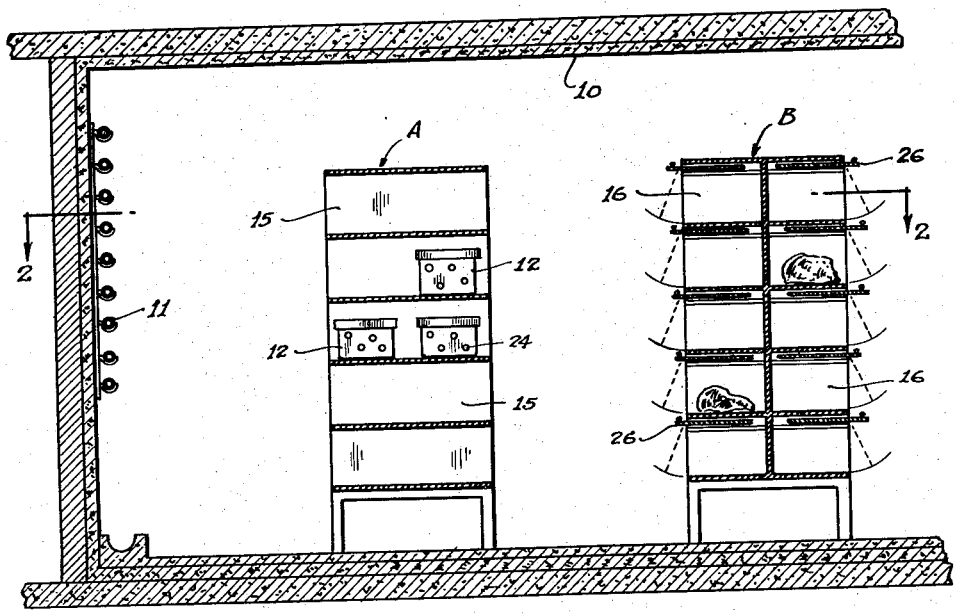
Figure 1 is a sectional elevation of a cooler containing open shelves A and cases B with compartments for the meat cuts to be aged.
Figure 2:
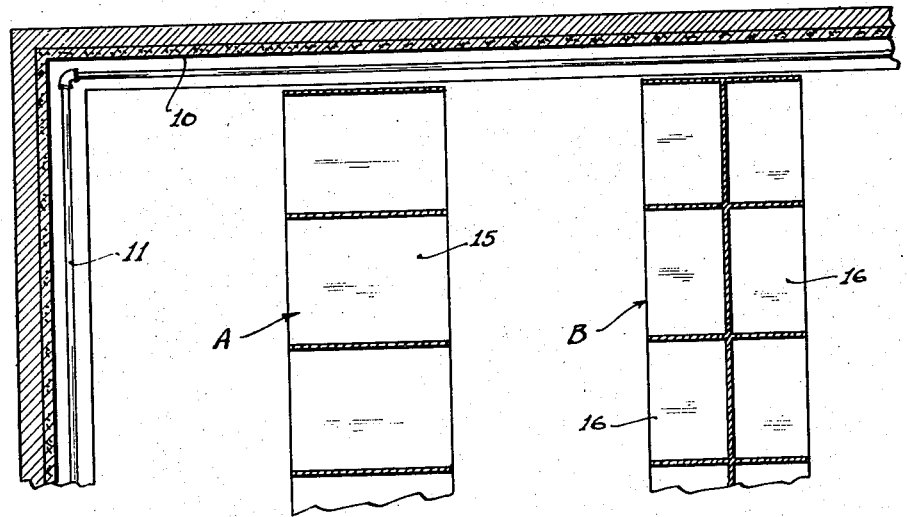
Figure 2 is a plan view taken on line 2—2 of Figure 1.
Figure 4:
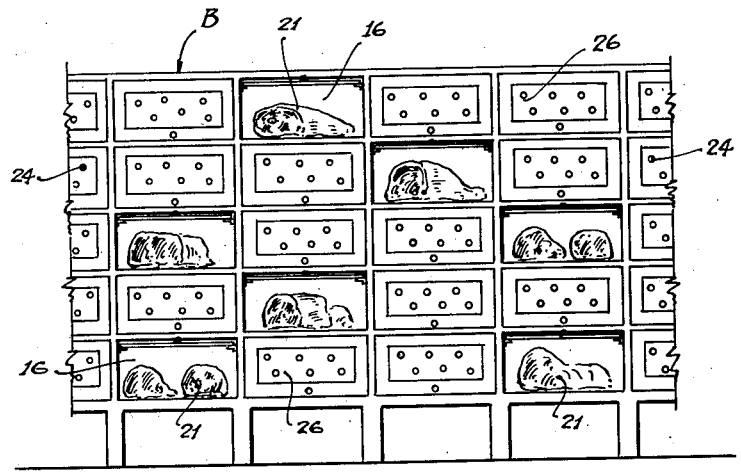
Figure 4 is a front view of a section of the cases B of Figures 1 and 2 with certain of the doors open to show the cuts of meat therein.

In ordinary aging of meat wherein the cuts have not been consigned to a consumer or identified for a particular purpose and wherein it is intended that the cuts will be removed from the aging zone prior to selling or shipping, compartments such as shown in Figure 4 may be used. The compartments may be a plurality of rectangular spaces integral with a larger case which may be set any place in the cooler or built into or adjacent to one or more walls thereof. The compartments are provided with doors 26 which may be opened to permit insertion of the meat and closed to form a relatively tight zone. The doors are provided with small holes similar to those in the box 12 of Figure 3.

The holes or perforations in the containers may vary in size and number. It is usually necessary to have one or more perforations in each panel of the box, although all the perforations may be in one panel. It is preferable to have adequate perforations so that sufficient diffusion takes place to effect the equivalent of one complete change of air in about 24 hours, although this time may vary considerably. It has been found that holes of about ⅛" to ¼" in diameter are satisfactory. It is desirable that the containers be sufficiently impervious to air to maintain approximately 100% humidity in the container.

As an example of the operation of the invention, a short loin of beef was placed in a fibre box containing about 6 perforations on each side of about ⅛" in diameter and having dimensions of about 2½ feet by 2 feet by 2 feet. The aging box containing the meat was placed in a cooler maintained under a temperature of about 29 to 33 degrees F. and a humidity of about 80 to 85 per cent. The temperature in the box ranged from 29½ to 33 degrees F. The humidity in the box was approximately 100%. After aging for about 10 days under the above conditions, the meat was very tender and had an excellent flavor and appearance. No material spoilage or dehydration of the surface occurred. The results were approximately equivalent to those obtained by aging 3 to 4 weeks by conventional methods.

The present invention has the advantage of providing substantially optimum conditions for the aging of meat. The relatively high humidity prevents the drying out of the surface and partial dehydration of the meat, and speeds up the aging process by making it possible for the enzymatic action to take place under moist conditions without excessive spoilage. For example, it has been found in aging cuts of beef according to the present invention that the shrink and trimming loss can be decreased 15 per cent or more as compared with the customary method of aging in a conventional cooler.

Furthermore, the present invention provides a convenient and precise method of aging meat under controlled conditions. The use of the special aging boxes makes it possible to age individual cuts for any desired time since some cuts require more aging than others to produce the desired ripening. The cuts may be placed in the boxes and dated so that the desired length of time of aging for any particular cut is secured. This method of operation may be applied with particular advantage to the individual aging boxes. These boxes are preferably the containers in which it is intended to ship the meat. The boxes containing the meat are marked up for the customer to be shipped at the end of the specified aging time. On the date at which the required aging is completed, the box and contents are shipped to the customer who may place the box in his refrigerator from which it may be disposed of as a whole or by opening the box, cutting off the desired portions and holding the remainder in the box until used. In this way, there is no transfer of the meat from the aging box whereby contamination and spoilage are more likely to occur. Moreover, the combined aging and shipping containers enables the producer to mark his product with trade marks or other identification either by attaching or printing the trade mark on the box or by making the perforations in the form of the identifying trade mark or design.

This application is a continuation-in-part of my application Serial No. 321,831, filed March 2, 1940.

Obviously many modifications and variations of the invention hereinbefore set forth may be made without departing from the spirit and scope thereof, and therefore, only such limitations should be imposed as are indicated in the appended claims.

I claim:

1. The method of aging fresh meat which comprises confining the meat in a ventilated aging zone, surrounding said zone with refrigerated air at aging temperatures and at humidities tending to cause dehydration, correlating the size of said aging zone, the amount of meat therein and the degree of ventilation whereby the evaporation of moisture from the meat raises the humidity in said zone to a point not greatly below the saturation point and sufficiently high to promote aging without substantial dehydration but insufficiently high to cause mold and slime formation, and maintaining the meat in said aging zone for sufficient time to obtain aging.

2. The method of aging fresh meat which comprises subjecting the meat to aging in a zone sufficiently confined to maintain the humidity near the saturation point and higher than the surrounding atmosphere to retard dehydration, surrounding the aging zone with refrigerated air to maintain the aging zone at aging temperatures, providing the aging zone with a predetermined amount of ventilation whereby the diffusion of air between the aging zone and surrounding atmosphere substantially prevents mold and slime formation on the meat and retaining the meat in said aging zone for sufficient time to obtain aging thereof.

3. The method of aging fresh meat which comprises subjecting the meat to aging in a zone sufficiently confined to maintain the humidity therein at about the saturation point by evaporation of moisture from the meat, surrounding the aging zone with refrigerated air maintained at temperatures of about 29° F. to 35° F. and humidities substantially below saturation to maintain the meat at aging temperatures of slightly below to slightly above freezing, ventilating the aging box to permit interchange of air between said aging zone and said surrounding air sufficient to suppress mold and slime formation on the meat and maintaining the meat in said aging zone until aged.

4. The method of aging fresh meat which comprises confining the meat in an aging zone of sufficiently restricted size with relation to the meat so that the evaporation of moisture from the meat builds up a high humidity approaching saturation and normally causing molding and sliming, surrounding said aging zone with an atmosphere having free circulation and having a humidity of about 80% to 85% and a temperature of about 29° F. to 35° F., ventilating said aging zone to provide sufficient diffusion between the air in said aging zone and said surrounding atmosphere to effect a complete change of air in said aging zone about every twenty-four hours, whereby the humidity in said aging zone is sufficiently high to promote aging without undue dehydration and whereby sliming and mold is substantially prevented, and maintaining the meat in said zone for sufficient time to obtain aging.

5. The method of aging fresh meat to improve the tenderness and flavor which comprises confining the meat in a relatively small perforated container wherein the evaporation of moisture from the meat substantially increases the saturation of the air therein, the perforations being of a size to maintain the humidity therein sufficiently above that of the surrounding atmosphere to retard dehydration and insufficient to produce substantial mold and slime, retaining said container in a relatively large refrigeration zone containing freely circulating air at temperatures ranging from not greatly below freezing to not greatly in excess of about 35° F. and at humidities of about 80% to 85%, and maintaining the meat in said container for sufficient time to obtain a substantial improvement in the tenderness and flavor.

6. The method of preparing fresh meat for market which comprises inserting the meat in a shipping and aging box containing perforations for diffusion of air, the size of said box and the area of said perforations being such that the humidity therein is maintained substantially higher than the surrounding atmosphere by evaporation of moisture from the meat, said humidity being sufficiently high to retard dehydration and insufficiently high to cause undue mold and slime formation, placing the box of meat in a refrigerator maintained at temperatures sufficiently low to produce a temperature of about 29° F. to 35° F. in said box, holding said box in the refrigerator until a substantial improvement in tenderness of the meat is obtained and then removing the box and meat from the refrigerator for shipment.

BEVERLY E. WILLIAMS.